Jan. 6, 1948. G. W. HARDY 2,433,990
CONTROLLABLE PITCH PROPELLER MECHANISM
Filed Aug. 13, 1943 5 Sheets-Sheet 1

INVENTOR.
GORDON W. HARDY
BY
*Geo. M. Soule*
ATTORNEY

Jan. 6, 1948.  G. W. HARDY  2,433,990
CONTROLLABLE PITCH PROPELLER MECHANISM
Filed Aug. 13, 1943  5 Sheets-Sheet 2

INVENTOR.
GORDON W. HARDY
BY
George M. Soule
ATTORNEY

Jan. 6, 1948.  G. W. HARDY  2,433,990
CONTROLLABLE PITCH PROPELLER MECHANISM
Filed Aug. 13, 1943  5 Sheets-Sheet 3

INVENTOR.
GORDON W. HARDY
BY
*George M. Soule*
ATTORNEY

Jan. 6, 1948.   G. W. HARDY   2,433,990
CONTROLLABLE PITCH PROPELLER MECHANISM
Filed Aug. 13, 1943    5 Sheets-Sheet 4

INVENTOR.
GORDON W. HARDY
BY
ATTORNEY

Jan. 6, 1948.  G. W. HARDY  2,433,990
CONTROLLABLE PITCH PROPELLER MECHANISM
Filed Aug. 13, 1943  5 Sheets-Sheet 5

INVENTOR.
GORDON W. HARDY
BY
George M Soule
ATTORNEY

Patented Jan. 6, 1948

2,433,990

UNITED STATES PATENT OFFICE 2,433,990

CONTROLLABLE PITCH PROPELLER MECHANISM

Gordon W. Hardy, Cleveland Heights, Ohio, assignor to The Marquette Metal Products Company, Cleveland, Ohio, a corporation of Ohio Application August 13, 1943, Serial No. 498,492

3 Claims. (Cl. 170—163)

This invention relates to a controllable pitch propeller mechanism and to a control system for adjusting the pitch of the blades while the craft served by the mechanism is in motion. The objects include provision of the following:

1. Arrangement for positive and accurate propeller blade control for effecting any pitch variation that could be desired and wherein the rotated weight is reduced substantially to a minimum and balanced.

2. An adjustable pitch propeller mechanism in which the blades are accurately, hydrostatically locked in the desired positions at all times, and:

2a. Wherein the locking pressures resisting pitch changing movement in opposite directions may easily be adjusted to effect the steadiest and most efficient possible performance of the mechanism.

3. A new type of electro-hydraulic propeller pitch control.

4. A new type of governor regulated adjustable pitch propeller mechanism.

5. A fluid pressure operated adjustable pitch propeller mechanism in which the pitch variation is accomplished by concurrently applied pressure and suction.

6. An improved manner of supplying from a stationary source, hydraulic fluid to a pitch adjusting servo-motor which rotates with the propeller and/or for supplying such fluid to the rotating assembly for other purposes as will be described.

7. An adjustable pitch propeller capable of multi-range blade adjustment wherein the rotated parts are of light weight; the center of gravity is relatively close to the outer main bearing support of the propeller shaft, and the propeller can easily be fitted to any conventional type of propeller driving shaft without changing the same in any way.

8. An efficient and balanced system for supplying de-icing fluid and distributing the fluid to all parts of the propeller mechanism which are likely to accumulate ice.

9. Means for de-icing the hub surfaces including those at or near the center of rotation where the rotational speed is least.

10. A simple and easily operated control apparatus for accomplishing all desirable pitch adjustments and including various safety features.

Other objects of the invention will become apparent from the following description of the embodiment shown in the drawings; wherein.

GENERAL DISCUSSION; COPENDING CASES

Some of the features of the present adjustable pitch propeller mechanism hereof are shown in my copending application Serial No. 476,398, filed February 19, 1943; and the present case, in respect to the manner of supplying de-icer fluid to the propeller blade surfaces, is, in a sense, a continuation of my application Serial No. 491,037, filed June 16, 1943, which became Patent No. 2,423,700. The adjustable pitch propeller mechanism I hereof differs generally from that of the first above mentioned application in that the present one operates to adjust the blades through the intermediary of hydraulic fluid moved under the control of an operator (e. g. pilot) or automatically in response to engine speed change, whereas the blades according to my said first mentioned application are mechanically adjusted by reactive forces imposed upon gearing in the propeller mechanism under control of an operator or suitable automatic means such as a centrifugal governor not disclosed in that application. The blade mountings are very similar in the two cases and selective pitch limit control for enabling ordinary pitch adjustments to be made within one set of limiting abutments and feathering and/or reverse pitch adjustments within limits determined by another set of abutments is also common to the two cases in a broad sense.

HUB CONSTRUCTION

The hub 2 is made as a high tensile steel shell (e. g. forged steel) with a spheroidally formed hollow central wall portion 3 from which tubular integral arms 4 extend radially, shown as three in number, equally spaced about the axis of rotation, namely the fixed axis of a drive shaft 5 projecting from an engine or motor of the craft served. The main support for the hub is constituted by a light weight high tensile steel hub carrier 6 securely fastened to the hub and drivingly keyed to the shaft 5 as at a keyway 7, Fig. 1.

BLADE MOUNTINGS; EQUALIZING GEARING

Figure 1:
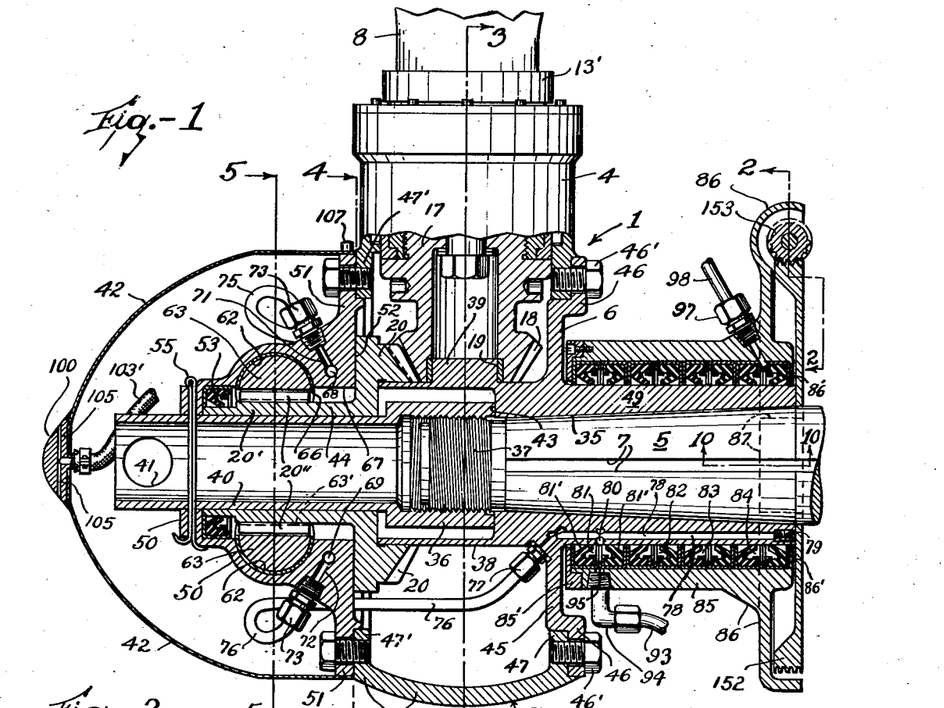
Fig. 1 is an axial central sectional assembly view of the propeller mechanism mounted on a supporting and driving shaft.
Figure 3:
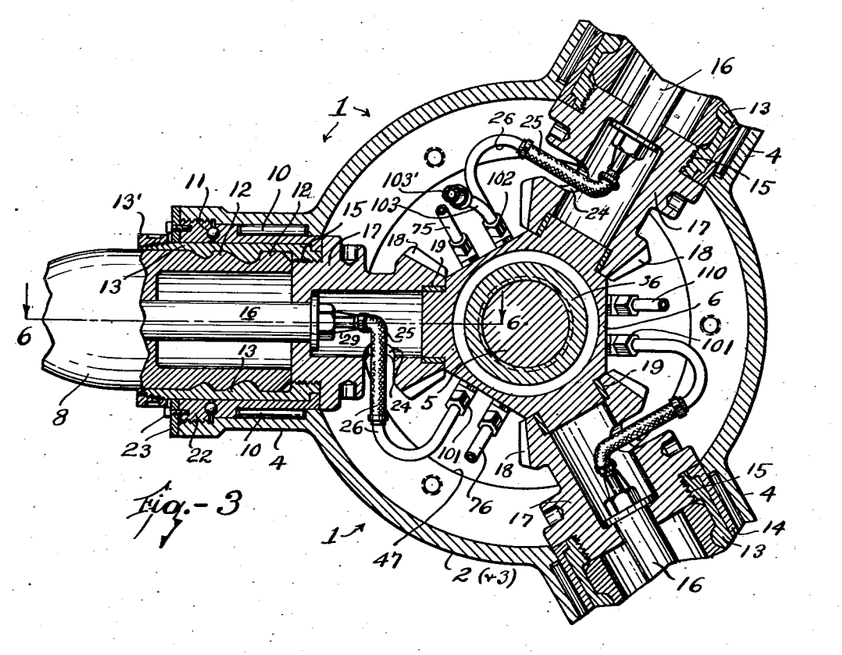
Figure 6:
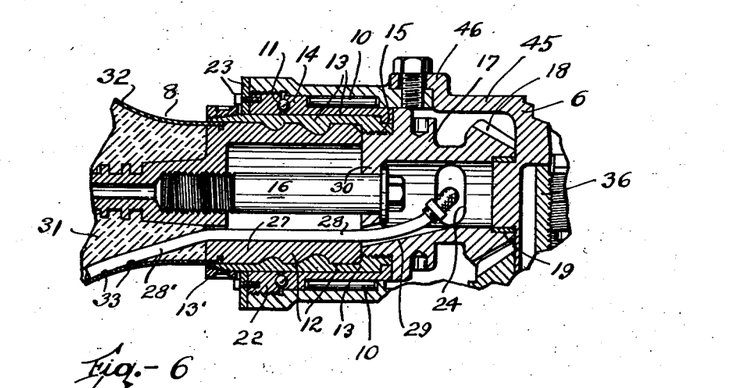
Fig. 6 (sheet 2) is a propeller blade shank and mounting detail section as indicated at 6—6 on Fig. 3.

The blades, shank portions 8 of which are shown in Figs. 1, 3 and 6, are supported for free turning movement about the radial axes of the respective arms 4 and within said arms on bearing assemblies including rollers 10 and thrust bearing elements 11 retained in position in much the same manner as are the similar bearing elements of my application Serial No. 476,398. The blades are strongly secured at buttress "thread" effects 12 to half shell sections which complement each other to form mounting sleeves 13. The sleeves 13 lie partly within inner bearing race sleeves 14 for the rollers 10 and are fastened, as at screw threads 15 and by central screw threaded studs 16, to enlarged shank or hub portions 17 of blade-pitch-adjusting bevel gears 18 having rigid pilot supports 19 at their inner ends on the hub carrier 6.

The blade-pitch-adjusting bevel gears 18 are in zero-backlash mesh with complementary teeth of a master or blade-pitch-equalizing and adjusting gear 20 as brought out by comparison of Figs. 1 and 3. The gear 20 is supported for rotation about the axis of the drive shaft and is readily turnable relative to said shaft for simultaneously adjusting all the blades to the same effective pitch angles. The support for and construction of the gear 20 are described later herein.

Referring further to the blades (Figs. 3 and 6) outward movement of each blade mounting assembly described above is prevented by abutment through the bearing elements 11 with adjustably threaded rings 22 in the outer ends of the tubular arms 4, and the rings are held in adjusted position taking up all end play by locking plate assemblies 23.

BLADE DE-ICING; OTHER FEATURES

As shown by Figs. 3 and 6 the bevel gear hubs 17 are hollow and laterally apertured at 24 so as to receive flexible portions 25 of supply tubes 26 for de-icer fluid (one for each blade). The hollow butt piece 27 of the particular blade construction shown provides a space in each blade for carrying the fluid from the flexible tube portions 25 to within the blades, as through connecting metal tubes 28 entering the respective shanks of the blades through openings 29 (Fig. 6) in outer end wall portions 30 of the gear hubs 17. The tubes 28 extend as at 28' within core body portions 31 (e. g. plastic filler for blade-surface-constituting metal shells 32) and along the leading edge portions of the blades for as much of the length of said blades as required for full de-icing, being apertured as at 33 for communication with the blade surface as more fully explained in my said application Serial No. 491,037.

BLADE ASSEMBLY FEATURES

It should be noted that the inner ends of the tubes 28 are inserted through the openings 29 (Fig. 6) before the blade mounting assemblies are completed to the extent of screwing in the gear hubs at 15 and inserting and tightening the studs 16. Assembly is possible notwithstanding the threaded connection at 15, and that the shell halves 13 are tightly pressed against the blade shank by the bearing sleeve 14, because until the stud 16 is inserted the tube 28 will merely move in an orbit within the hollow shank piece 27 of the blade as the hub 17 is screwed into place. The shell halves are made from a single fully machined tube, split afterwards lengthwise into halves, and the threads at 15 are made the reverse of the threads of the stud 16 for opposite locking effect when the stud is finally turned tightly into place. A slightly taper-threaded clamping ring 13' is shown in Figs. 3 and 6 for forcing the outer end portions of the split sleeve sections very tightly against the shank or butt portion of the blade illustrated. Tightening of the clamping ring is a final assembly operation on the various blade units.

The connections between the flexible tubes 25 and the inner free ends of the tubes 28 are made through the open ends of the gears 18 before said gears are inserted through the hub arms 4 and, afterward, the other necessary connections of the tubes are made through the still open outer end of the hub 2, or, in other words, before the master gear 20 is installed. The manner in which fluid is supplied to the tubes 26 during rotation of the hub will be explained later.

HUB CONSTRUCTION (CONTINUED)

*Efficient distribution of mass*

Referring further to the carrier 6 (Figs. 1 and 3) said carrier is shown having a central tapered bore 35 which is wedged onto the shaft 5 by a nut 36 engaging threads 37 of the shaft in the plane of the gears 18 and lying within and in spaced relation to a tubular terminal portion 38 of the carrier which has radial cylindrical posts 39 constituting the supports for the pilot bearings 19 of the bevel gears 18. The nut 36 has a light weight forwardly projecting tubular portion 40 which extends beyond the entire hub assembly except for a spinner or hub end cover 42 and associated parts to be described later; and the outer end of the extension 40 has capstan-wrench holes at 41 to jam the nut tight against a shoulder 43 of the carrier.

It is to be understood that the drive shaft and carrier connection as herein shown and just described is for example only. Other styles of shafts (e. g. splined shafts) on the heavier types of aircraft would require a different arrangement, but that would not essentially or materially change the present mechanism and construction.

The tubular portion 38 of the hub carrier 6 forms a pilot bearing support for the equalizing and blade-adjusting master gear 20; but an elongated tubular hub 44 of the gear has a free turning fairly snug fit on the tubular shank 40 of the nut 36 as a main support for said gear 20. The hub carrier 6 has on the engine side of the hub 2 a circular flange 45, lying very close to the bevel gears 18 to conserve axial space, and which is turned rearwardly at 46 to make a snug fitting stepped joint with an inturned end flange 47 of the hub 2. The flanges are fastened together as by appropriate screws 46'. The relatively thick walled tubular portion 49 of the carrier 6 projecting toward the engine and in which the principal portion of the tapered bore 35 for the shaft 5 is formed, provides a support for a fluid distributor or manifold assembly and ducts for fluid supplied therethrough as will be described later herein.

BALANCED, DOUBLE ACTING, PITCH ADJUSTING SERVO-MOTOR

At the outer end of the hub 2 and fastened securely to the hub at a flange 47' thereof, similar to the flange 47, is a servo-motor housing 50, preferably of forged aluminum or other light weight, strong metal to reduce as much as posible cantilever-supported weight at the outer hub end. The housing 50, inwardly from its attaching flange 51, slidingly abuts the master gear 20 at 52 and maintains the latter in close meshing (zero backlash) relation to the gears 18. The abutment with the gear face 52 can be nicely adjusted by means of thin shims between the flanges 47' and 51, removed in servicing if necessitated by occurrence of wear of the gear teeth.

The forward reduced end of the housing 50 is formed to provide a sealing chamber for a flexible oil-sealing assembly 53 of conventional form surrounding the outer end 20' of the hollow hub 40 of the gear 20—sealing thereagainst. Outwardly beyond the sealing chamber the housing carries a locking key for the hub-assembly-securing nut 36, in the form of a cotter pin 55 as shown. The tubular end of the nut has, of course, a series of openings for the cotter pin, not shown.

Figure 5:
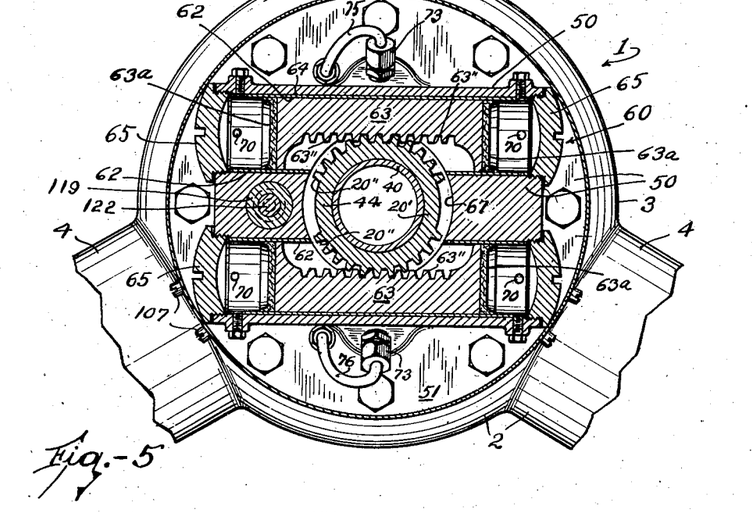
Figure 8:
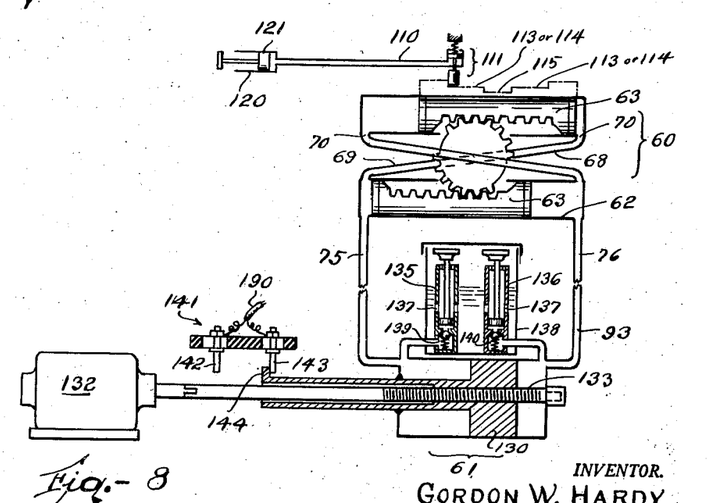
Fig. 8 (sheet 4) is mainly a mechanical fluid circuit diagram showing the manner in which the blades are operated hydraulically to change their pitch and released to perform more than ordinary pitch changes, and also showing how the hydraulic working pressures are initially adjusted and subsequently controlled and limited.
Figure 9:
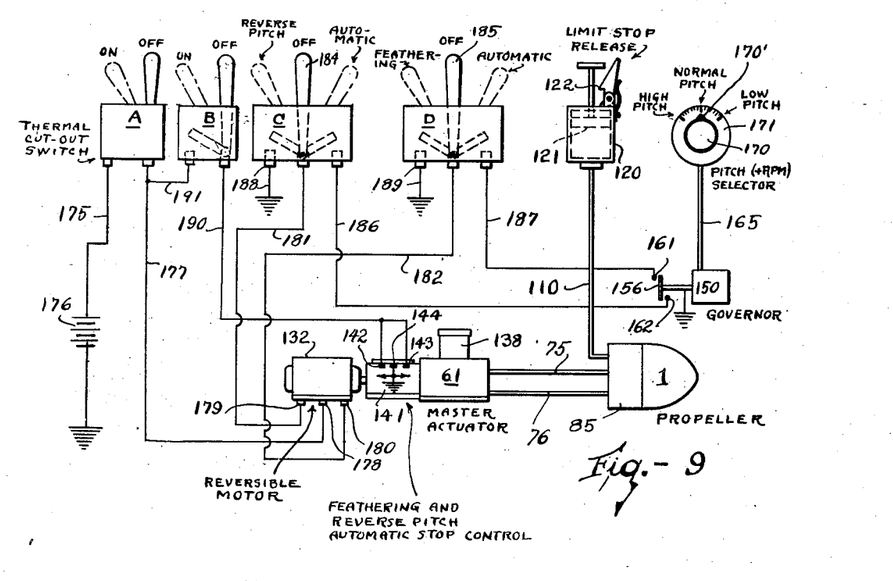
Fig. 9 is mainly an electrical diagram further showing the control system.

The pitch-adjusting servo-motor, indicated generally at 60 in Figs. 1, 5 and 8 (latter two on sheet 4) and which is operated by a hydraulic actuator or "master" motor 61, Figs. 5, 8 and 9 is fully balanced dynamically and in respect to force reactions and comprises two cylinder-plunger assemblies constituted by substantially identical cylinders 62 (sleeves as shown) and complementary pistons or plungers 63 with cup-shaped sealing discs 63a at their ends, all operatively suported by the housing 50. In the particular construction shown the pistons 63 are preferably light weight bronze (e. g. Toban bronze) and slide in steel sleeves which constitute the cylinders 62. The latter, as shown particularly in Fig. 5, are pressed into complementary parallel bores 64 in the housing 50 which bores are closed at their outer ends as by identical caps or plugs 65 threaded into the housing 50.

The sleeves 62 are laterally open intermediately of their ends and adjacent each other, being cut away as at 66 in partial approximate registration with a central bore 67 of the housing 50 containing the hub 20' of the master (equalizing) gear 20 which has spur gear teeth 20'' formed thereon for meshing (zero backlash) relationship with rack teeth 63' on the respective pistons or plungers 63. The rack teeth are formed on parallel cut-away portions of the respective plungers intermediately of their ends so that the forces applied by the plungers to the gear teeth are approximately along the axes of the plungers for minimizing lateral thrust on the latter.

FLUID SUPPLY SYSTEM (IN PART)

Hydraulic fluid is fed to the servo-motor cylinders 62 from generally parallel bores 68 and 69 in the housing 50 (see Figs. 1 and 8) which communicate with the cylinder ends through lateral short bores 70 (Fig. 5). The bores 68 and 69 are served with fluid through obliquely extending passages 71 and 72 respectively (Fig. 1) which lie in a plane coincident with the hub axis, so that fittings 73 (Fig. 1), used to connect the passages 71 and 72 with respective feed tubes 75 and 76, are balanced about the hub axis. The tubes 75 and 76 pass through holes in the housing 50 and their rearward ends are connected, as exemplified by the fitting 77, Fig. 1, with respective parallel axially extending bores 78 in the thickened tubular part 49 of the hub carrier 6. Only the bore 78 which supplies the tube 76 is illustrated. The tube 75 is connected to another of said axially extending bores 78 formed in the part 49 circumferentially spaced from the illustrated bore.

Two other bores 78 beside the ones which serve the tubes 75 and 76 are formed in the carrier part 49 (purpose described later), and all the bores are closed at their rear ends, toward the engine, as by plugs 79, one being shown. Each of the bores 78 communicates, through a respective short radial bore 80 (one shown), exclusively with a different one of a set of parallel annular supply chambers or channels 81, 82, 83 and 84 surrounding and in sliding sealed relation to the smooth circular periphery of the part 49 of the hub carrier.

SEMI-FLOATING FLUID MANIFOLD

Fluid Supply System (Continued)

Figure 10:
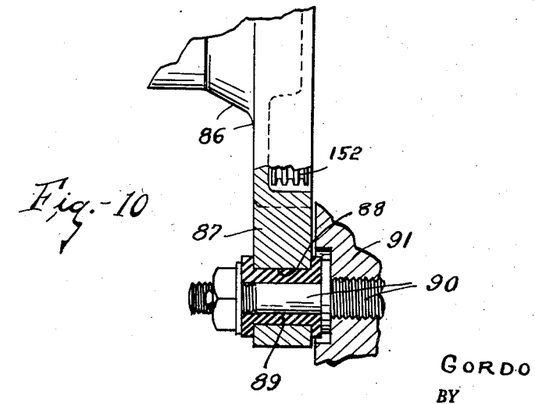
Fig. 10 is a fragmentary sectional detail view of a yieldable mounting or anchorage device for a fluid distribution unit of the propeller assembly, taken as indicated at 10—10 on Fig. 1.

The supply channels 81—84 are contained in a rigid tubular manifold-constituting portion 85 of a metal housing member 86 which portion 85 is substantially coextensive with the carrier portion 49 and has a yieldable anchorage with the engine, shown in Fig. 10, so that the manifold, although fixed in position, does not require centering with respect to the carrier but can float on the carrier. As shown in Fig. 10 a depending bracket portion 87 of the housing 86 has a bore 88 parallel to the driven shaft 5 and in which a spool-like sleeve 89 of elastic compressible material (e. g. synthetic rubber) is snugly seated as by a force fit. The sleeve in turn receives and is radially expanded by a stud 90 fastened to the engine housing, a small portion of which is indicated at 91. The support afforded by the device shown in Fig. 10 is sufficient to relieve the propeller hub carrier of having to support the principal weight of the housing 86, yet said housing can nevertheless float slightly for maintaining concentricity with the carrier portion 49.

One supply tube 93 (for feed channel 80) is shown as secured to the manifold portion 85 of the housing 86 by a fitting 94. The interior of the fitting 94 communicates with the effective channel space 81 through a short radial bore 95 in the manifold 85 and passages (not shown) formed between two adjacent sheet metal sealing ring retainer shells of channel shape respective to sealing rings 81' which are oppositely positioned so as to constitute the channel 81 in bearing yieldably against the adjacent peripheral surface of the tubular portion 49 of the carrier 6. The other manifold channels 82, 83 and 84 are formed similarly to the one just described.

FURTHER FEATURES OF MANIFOLD SYSTEM

The channels formed by the opposed pairs of sealing ring assemblies (yieldable rings and rigid shells or casings) are prevented from communicating with each other by reason of close fitting abutment of the backs of the non-paired casings and close fitting (press fit) peripheral contact between each of the casings and the bore of the portion 85 of the housing 86 in which the sealing rings are held in close abutment (back to back and face to face) as between an annular end plate 85' at one end of the sealing ring assembly generally and an inturned flange 86' at the other end. The pairs of sealing rings could be further isolated by interposed resilient compressible gaskets, though I have not found such expedient necessary.

DE-ICER FLUID DISTRIBUTION

Each manifold channel 81—84 has a supply fitting similar to that indicated at 94 at an appropriate position around the manifold. The fitting for the channel 84 is shown at 97. The supply tube 98 for that particular fitting and the manifold channel 84 and respective conduits 26 served thereby (blade de-icing conduits previously described) is connected as to a reservoir for de-icing fluid (not shown). The reservoir or its discharge pipe, would have a suitable pump actuatable at the will of the pilot or other operator for supplying the de-icer fluid at the proper times. The manifold or distributor channel 84 has three equally spaced axially extending discharge bores 78. Each of the other channels has but one such discharge bore.

Two of the three outlet fittings, corresponding to 77 Fig. 1, and which are connected respectively to the three parallel blade-de-icing outlet bores 78, just mentioned, are indicated in Fig. 3 at 101. One is marked 102 and that constituting, in effect, a Y or T- fitting one branch of which, at 103, has a flexible extension 103' leading through a hole in the servo-motor housing 50 to a hub-de-icing distributor nozzle device 100 (Fig. 1 only) mounted centrally of the spinner or cap 42. The other branch of the Y or T-fitting 102 and both of the fittings 101 connect with the blade de-icing system tubes 26 (Figs. 3 and 6) already described.

HUB DE-ICER

The spinner-supported nozzle 100 has several radially disposed outlet jet openings 105, two of which are shown. The jet outlets lie in a low pressure area of the spinner created by deflection of slip stream due to the forward projection of the nozzle body so that de-icer fluid supplied to the jet openings will be distributed over the spinner from several points where the fluid can then flow rearwardly over the spinner, hub and blade shank portions.

The spinner shell 42 is secured as by wired-on screws 107 (wires not shown) to the outer flange portion of the servo-motor housing as a last operation in assembling the propeller unit described above; and the flexible de-icer fluid tube section 103' which connects with the spinner supported nozzle device 100 has to be made long enough to permit connection with said nozzle device before the spinner is secured to the hub.

Since ice always tends to form first on the central portion of the hub which rotates at lowest peripheral speed the application of de-icer fluid to that region assists greatly in de-icing the blades. A considerable portion of the ice formed on the blades is usually started as accumulations first formed on the hub and then caused to flow outwardly by centrifugal force to the blades, viz: glacier effect.

CONTROLLED PITCH LIMIT STOP MECHANISM

Referring further to the manifold distributor channels 81—84 it is assumed that the channels 81 and 82 are connected to respective pressure chamber spaces of the master hydraulic actuator 61 as brought out schematically in Figs. 8 and 9 (sheets 4 and 5); that the third channel (83) supplies through its associated axial bore 78 and fitting such as 77 a tube 110, right Fig. 3, inside the hub. That particular tube (110) also leads through the servo-motor housing as do the tubes 75 and 76 for connection with a pitch range selector latch-abutment mechanism 111 illustrated in detail in Fig. 7 (sheet 3) and also indicated, schematically on the fluid circuit diagram Fig. 8.

Figure 4:
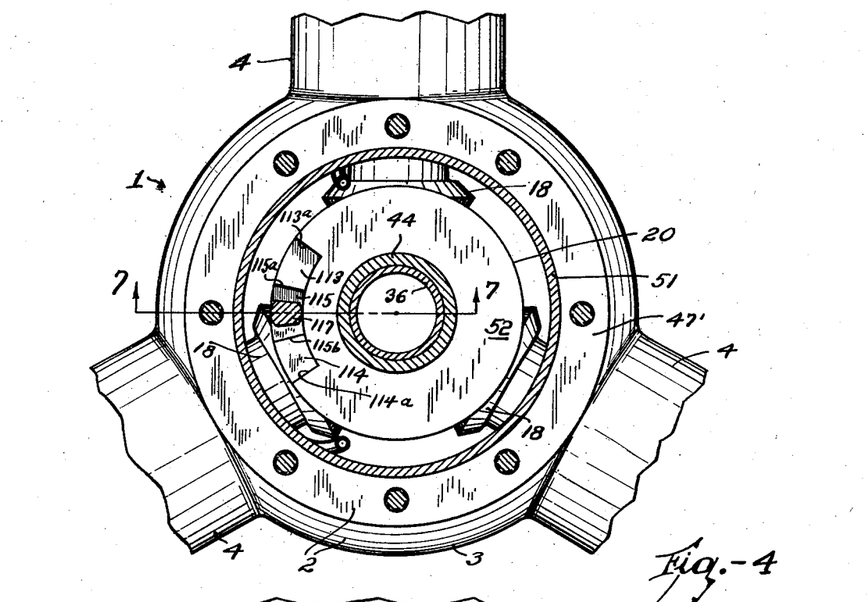
Figure 7:
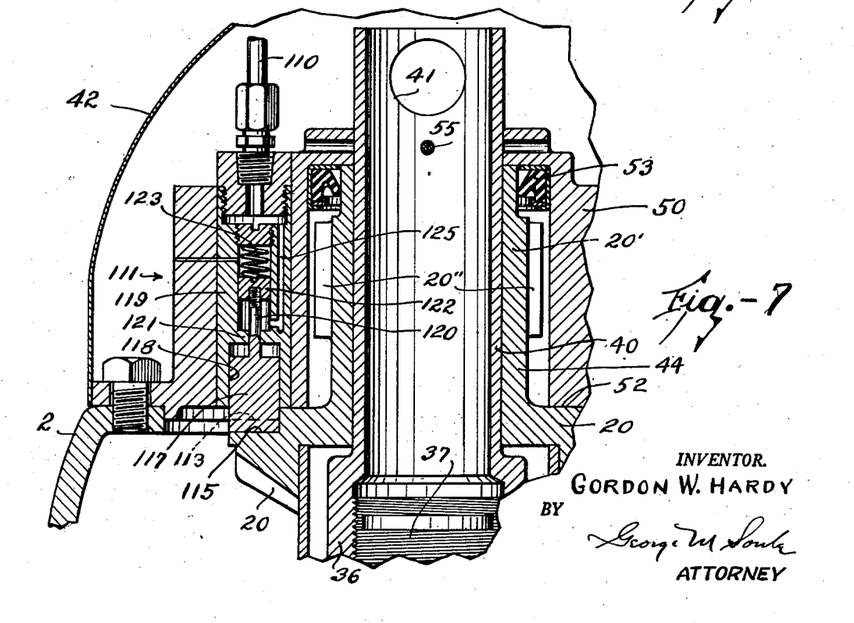
Fig. 7 (sheet 3) is a sectional detail view taken as indicated at 7—7 Fig. 4 showing a normal-pitch-limiting latch mechanism.

The purpose of the latch mechanism 111 is normally to prevent the blades from being shifted below and above minimum and maximum pitch angles appropriate for forward driving of the ship, while enabling angular movement of the blades on their swivel mountings below minimum normal pitch for reverse (i. e. for braking) and above maximum normal pitch (i. e. for feathering). As illustrated in Figs. 4 and 7 the surface 52 of the master gear 20 is indented at regions 113 and 114; and between those indentations is a deeper indentation 115. Normally seated in the depression 115 is a latch block 117 in a non-circular guide bore 118 of a latch mechanism housing 119. The latch block has a stem 120 projecting slidably through a partition wall 121 of the housing into a cylinder bore in which a piston part 122 of the stem slides. A spring 123 in a vented upper part of the cylinder normally biases the latch block 117 toward whatever indented face (113, 114, or 115) of the gear 20 the block may be adjacent.

To operate the latch block to master-gear-releasing position, relative to abutment surfaces 115a and 115b defining opposite circumferentially spaced limits of the indentation 115, fluid is supplied under pressure through the distributor channel 83, tube 110 and a passage 125 to the cylinder bore below the piston 122. The latch block cannot be lifted forwardly out of the indentations 113 and 114 by over-supply of fluid through the tube 110.

Once the latch block 117 is withdrawn from the indentation 115 and the gear 20 then moved to position one of the other indentations in operative alignment with the block, the fluid force which withdrew the block may then be released with assurance that the gear will finally be arrested in full feathering or safe reverse pitch position, whichever is selected as the desired abnormal pitch. However, as in Fig. 9, wherein the tube 110 is shown connected to the cylinder 120 a hand actuatable plunger 121 and a plunger retaining latch is provided as at 122 automatically to hold the fluid pressure in the line 110 sufficient to cause the latch block 117 to remain out of range of the stops 115a and 115b until release of the latch 122 by the operator. Such latch 122 on the hand actuator for the pitch limit release latch 117 enables the operator to adjust blade pitch at will as from a very low pitch through the normal angles determined by the abutments 115a and 115b and therebeyond past the normally limited high pitch.

The angular relationships of the abutment surfaces 115a, 115b and 113a and 114a (Fig. 4 only) are or may be the same as those of the corresponding "pitch limit stops" of my application Serial No. 476,398. The "master" hydraulic motor 61 may be operated wholly manually in simple installations.

FLUID SYSTEM SCHEMATIC; MASTER ACTUATOR

Reference to the hydraulic actuator fluid system as shown in Fig. 8 will assist in a better understanding of the mechanism hereof. In Fig. 8 the piston 130 of the "master" hydraulic motor or actuator is shown in a position assumed to be the limit of its stroke to the right, which, by forcing fluid through the tubes 75 and 76 and cross connecting tubes 68 and 69 of the servo-motor cylinders, has moved the blades to the full feathering position, bringing the appropriate limit abutments (113a or 114a) against the latch block 117. The abutments of the gear 20 are shown as though directly associated with one of the plungers 63 of the servo-motor 60, which could, theoretically at least, be the mechanical arrangement, result being the same.

The master hydraulic motor 61 may be arranged in strict accordance with my application Serial No. 480,023, filed March 22, 1943 entitled "Hydraulic actuator." In common therewith, the plunger 130 hereof is driven by a reversible electric motor 132, a control system for which is shown in Fig. 9 and explained later herein. The motor drives a screw 133 directly or through reduction gearing, preferably the latter (not shown) so that the motor can be small and of light weight and require very little current.

When current to the reversible motor 132 is cut off, friction and inertia of the screw 133 and the hydraulic load immediately arrests the plunger 130. The screw is inherently self-locking, insuring that the blades will remain indefinitely in adjusted position until further movement is imparted to the actuator piston 130.

CONTROLLED HYDRAULIC LOADING ETC.

To charge the hydraulic system with fluid small hand-operable pumps are shown at 135 and 136 having inlets 137 continuously immersed in fluid in a storage reservoir 138 and with outlets connected, as through one-way-operating or check valve chambers 139 and 140, with respective ends of the master cylinder. The charging apparatus or its equivalent can be placed anywhere in the ship; but preferably is within easy reach of an operator so that the pressure in either side of the system can be increased at any time. Thus the system can always be kept fully charged regardless of slight leakage, should such occur; but, mainly, the arrangement enables controlled flutter or vibration resisting or cushioning of the blades as may be found desirable at different speeds. Hydraulic fluid alone, without entrapped air and in vertically rigid conduits, is somewhat compressible and therefore may be made to have variable cushioning and vibration damping effects. If the compression can be adjusted the tendency for the blades to flutter can often be checked altogether and in any event the vibration can be damped considerably or eliminated by resistance of hydraulic columns; and whatever vibration continues to occur can be prevented or partially prevented from being transmitted to the engine. Pressure gages connected with the opposite ends of the "master" cylinder can be used to inform the operator of the instantaneous pressures resisting opposite pitch change movement of the blades.

MOTOR-PROTECTIVE AUXILIARY PITCH LIMIT CONTROL

Adjustable, electrically operated contacts 142 and 143 of a feathering and reverse pitch automatic stop control device 141 may be used to protect the motor 132 against continued current supply when stalled. The device, in a sense, augments the extreme pitch limit abutments 113a and 114a by causing current to cease to be supplied to the motor 132 when the propeller blades reach full feathering and maximum permitted reverse pitch positions. The contacts may be engaged for control operation by an electrical-ground-constituting portion of the mechanism, for instance a sliding key 144 on a sleeve portion of the master piston 130 which key prevents said piston from turning in its cylinder.

ADJUSTABLE CONSTANT SPEED CONTROL

Figure 2:
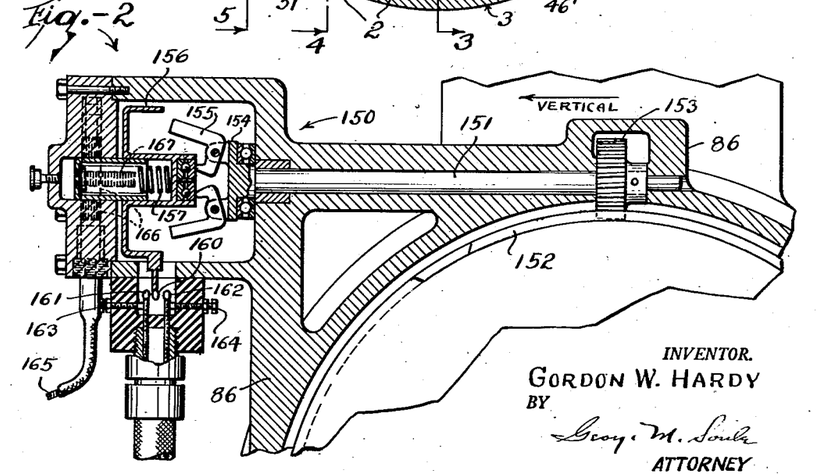
Figs. 2, 3, 4 and 5 are transverse sectional assembly views taken as indicated by lines 2—2 etc. to 5—5 on Fig. 1.

Fully automatic pitch control for constant speed may be had through the intermediary of a speed responsive "governor" device driven by the propeller or engine thereof. The governor 150, Figs. 2 and 9, controls the reversible electric motor consequent upon speed variations within adjustable limits and at different speed settings.

A vertical governor drive shaft 151 (shown in horizontal position in Fig. 2) is turned at relatively slow speed by the engine shaft through the intermediary of helical gearing including a driving gear 152 fixed on the hub carrier portion 49 within the housing 86 and a pinion 153 rigid on the shaft 151. A fly-ball head 154 has ball arms 155 pressing with increasing force against a slidable control head 156 proportional to increase in speed. Movement of the governor control head by the ball arms is resisted by a "speeder" spring 157 (partially omitted) the compressive force of which spring may be adjustably altered by a speeder plug 158 for change of speed setting, or, in other words, adjusting the value at which the governor will hold the engine speed by causing compensating variations in pitch angles. The ultimate operation of the governor is conventional in adjustable pitch propellers; but the manner in which the constant speed is maintained has unique features.

MOTOR CONTROL BY GOVERNOR

The control head 156 moves a "ground" contact 160 alternately against two opposed insulated electrical conductor terminals 161 and 162 which are adjustable toward and away from each other as by screws 163 and 164 respectively. The speed is held more accurately, by more frequent pitch adjustments, when the insulated contacts 161 and 162 are more closely spaced. The conductors of the contacts 161 and 162 cause, respectively, clockwise or counterclockwise rotation of the driving motor 132 of the hydraulic master or actuator for the blade adjusting mechanism.

PITCH AND SPEED SELECTOR

The continuous speed (pitch) is selected and set by adjustment of a flexible torque shaft 165 (Figs. 2 and 9) connected to the speeder plug at one end through a pinion and rack mechanism 166, 167 of conventional form and at the other end with a selector knob 170 (Fig. 9 only) having a pointer 170' which indicates the instantaneous speed settings by reference to appropriate marks on an associated dial 171 as the knob is turned either way from a "normal" speed (and pitch) position, pointer vertical as shown.

Turning of the knob 170 to the left from the illustrated position increases pitch and thereby causes lower engine speed by increasing the engine load; and turning of the knob to the right has the reverse effects, decreases pitch etc.

CONTROL DIAGRAM

Referring further to the control diagram, Fig. 9, four snap switchs are shown which require manual adjustment, said switches being marked A, B, C and D. The switch A is a thermal cutout switch interposed between a feed wire 175, leading from a power source (e. g. battery) 176 to the switch, and a feed wire 177 leading to a central trunk terminal 178 of the motor 132. The battery is grounded as to the engine mounting, and additional terminals 179 and 180 of the motor are arranged to be grounded either directly through the respective switches C and D or through the governor-controlled contacts 162 and 161 already described. The contacts 162 and 161 are arranged to be placed in series with the switches C and D, respectively, by manipulation of said switches. If the motor circuit is grounded through the wire 181 which connects with the switch C, the motor operates in the required direction to move the blades toward low pitch and reverse pitch position, and if the motor is grounded through the wire 182, which connects with switch D, the motor turns in the reverse direction, toward high pitch and feathering positions.

The control finger pieces or arms 184 and 185 of the switches C and D, respectively, are shown in off position in full lines, as are the switch arms of all four switches A to D. When arms 184 and 185 are flicked to the right, the governor 150 assumes automatic pitch control or regulation by virtue of connecting the two wires 181 and 182 from the motor to wires 186 and 187 leading from the respective switches C and D to the governor contacts 162 and 161 respectively. When the switch arm 184 of switch C is flicked to the left from "off" position, or from "automatic" control position through "off" to the most leftward position the motor is energized manually, as for causing reverse pitch, through switch ground wire or connection 188. Such manual control operation is done when the switch D is in the "off" position illustrated. Similarly, when this switch arm 185 of switch D is moved to the left from or through "off" position (switch C then "off") the motor is operated toward feathering by establishing a circuit through a ground wire or connection 189.

The manual controlling operations just described are ordinarily used only when reverse pitch or feathering operations are desired, hence, before accomplishment of those operations, the limit stop latch releasing is effected by movement of the plunger 121 to lift the stop pin or block 117 from engagement with the master equalizing gear of the propeller at the central or intermediate indentation 115 of said gear.

The switch B, as shown in Fig. 9, has its movable contact arm connected to both the adjustable contacts 142 and 143 of the feathering and reverse pitch automatic control device already described as through a line 190, and a fixed cooperating contact of the switch B is normally connected to the battery through a line 191 shown as branching from the motor trunk feed wire 177 between the switch A and the motor. The motor protective circuit or control arrangement, in the particular form shown, requires the switch B in order that when one of the contacts 142 and 143 temporarily short circuits the system in shunt with the motor, as through lines 190, 191 and the thermal cut-out switch A, causing the latter promptly to break the motor feed circuit, the contact 141 or 143 which has engaged the ground terminal 144 can be moved away from said terminal. Otherwise (considering, for the moment, 190 connected permanently to 191) the operator could not restart the motor to reverse it from the direction of rotation which brought the contacts 142, 144 or 143, 144 together and caused the temporary short circuit.

It should be noted that in the event the governor-controlled operation previously described causes operation of the motor 132 until one of the limiting abutments 115a and 115b is engaged by the limit stop element 117, dangerous overheating of the motor would be prevented by automatic operation of the thermal switch A to "off" position before damage to the motor can occur.

The circuit arrangement described above is designed to use standard snap switches and, in the case of switch A, a standard thermal cut-off snap switch is used. By providing switches built especially to serve the essential purposes described, the number of manipulatable elements could be considerably reduced and the control operations thereby possibly simplified.

CONTROL SYSTEM OPERATION (EXAMPLES)

Before flight is commenced, the pilot makes certain that switches A and B are "on" and C and D are in "automatic" positions; that the limit stop is released (block 117 in condition to enter gear indentation 115), and that the pitch selector knob 170 is set at or near "normal" speed setting.

For take-off or climbing, the pitch selector is moved to "low pitch" setting so that the engine can accelerate properly.

In flight upon assuming the desired level or altitude the pitch selector knob is adjusted to "normal" or other desired position causing adjustment, through the governor, of the desired speed at efficient R. P. M. of the engine. The governor mechanism then causes attainment of automatic constant speed.

For normal landing, switches A and B are still left in "on" position; C and D in "automatic," and the pitch selector knob is moved to "low pitch" (high R. P. M.).

To land with braking effect, the first operation is to depress the plunger 121 for pitch limit stop release. The switch D is moved to "off" position and switch C is then moved through "off" position to "reverse pitch" position. Reversing of pitch is then accomplished automatically and will be limited by the engaged abutment 113a or 114a corresponding to reverse, and if the pilot leaves the switch C in "reverse pitch" position the motor circuit will be immediately broken by operation of the automatic stop control device 141 as described, through operation of the thermal cut-out switch A.

To resume normal operation after reverse, the limit stop release plunger latch 122 is released; switch B is moved to "off" position; C and D to "automatic" positions, and A is then closed. The blades could, of course, be moved toward normal setting by manual operation of the mechanism through temporarily setting the switch D at "feathering." The switch B is returned to "on" position as soon as the motor 132 starts to turn.

For feathering, switches A and B are in "on" position, switch C is moved to "off" and D to "feathering" position. To unfeather the blades from full feathered position in which the automatic stop control 141 short circuits the system to stop the motor 132, the procedure is substantially the same as described in the next preceding paragraph after full reverse pitch operation has obtained.

I claim:

1. In combination with a variable pitch propeller having a blade-supporting hub, a hydraulic servo-motor on the hub having opposed non-communicating displacement chambers, a master hydraulic cylinder and a piston therein, the opposite ends of the cylinder being hydraulically permanently connected with respective displacement chambers of the servo-motor, positively acting means connected to the piston to move it back and forth in its cylinder and to lock it in adjusted positions thereby to lock the blades, and pumping means in respective sides of the hydraulic system to maintain individually adjusted pressure in said sides.

2. In an adjustable pitch propeller, a hub having blades swivelled thereon, mechanism revoluble with the hub for adjusting the blades to determine their pitch, said mechanism including permanently interconnected gear elements constituting equalizing gearing connecting the blades, a pair of pitch limiting stops on one of said elements of the gearing, a plunger on the hub normally positioned between said stops, hydraulically operated means arranged to move the plunger out of said position to enable abnormal pitch changing movement in at least one direction, said means including a latch for automatically holding the plunger out of the path of movement of the stops, and hydraulic actuating means positioned remotely of the hub and operatively connected with said hydraulically operated means.

3. In an adjustable pitch propeller, pitch adjustable blades, a hydraulically two-way-acting mechanism for effecting the pitch adjustment, an electric motor for driving said mechanism, releasable mechanically acting limit stops on the propeller arranged to limit the pitch adjustments of the blades within a certain working angle range, and electrically operated limit stop switch means operating to control the motor for limiting adjustment of the blades beyond said certain working range.

GORDON W. HARDY.

REFERENCES CITED

The following references are of record in the file of this patent:

UNITED STATES PATENTS

| Number | Name | Date |
|---|---|---|
| 2,156,103 | Austin | Apr. 25, 1939 |
| 1,878,358 | Yates | Sept. 20, 1932 |
| 2,237,191 | Mills | Apr. 1, 1941 |
| 2,229,058 | Dicks | Jan. 21, 1941 |
| 1,887,053 | Yates | Nov. 8, 1932 |
| 1,886,891 | Martens et al. | Nov. 8, 1932 |
| 2,161,917 | Forsyth et al. | June 13, 1939 |
| 1,829,930 | Hele-Shaw et al. | Nov. 3, 1931 |
| 2,296,348 | Hoover | Sept. 22, 1942 |
| 2,020,366 | McCallum | Nov. 12, 1936 |
| 2,276,347 | Ruths et al. | Mar. 17, 1942 |
| 2,320,195 | Rindfleisch | May 25, 1943 |
| 1,851,874 | Seppeler | Mar. 29, 1932 |

FOREIGN PATENTS

| Number | Country | Date |
|---|---|---|
| 464,203 | Great Britain | Apr. 12, 1937 |
| 217,669 | Switzerland | Apr. 16, 1942 |
| 18,445 | Holland | 1897 |
| 379,731 | Italy | Apr. 4, 1940 |
| 449,407 | Great Britain | June 26, 1936 |
| 796,083 | France | Mar. 28, 1936 |

OTHER REFERENCES

The Bee-Hive, May–June 1938, published by United Aircraft Corp., East Hartford, Conn. (Copy in Div. 9.)